Dec. 8, 1959 J. C. STRICKLER 2,916,000

CAN CLOSING MACHINE

Filed Oct. 8, 1953 5 Sheets-Sheet 1

INVENTOR.
JOHN C. STRICKLER

BY

Mellin and Hanscom
ATTORNEYS

CAN CLOSING MACHINE

Filed Oct. 8, 1953 5 Sheets-Sheet 2

INVENTOR.
JOHN C. STRICKLER
BY
Mellin and Hanscom
ATTORNEYS

INVENTOR.
JOHN C. STRICKLER
BY
Mellin and Hanscom
ATTORNEYS

CAN CLOSING MACHINE

Filed Oct. 8, 1953 5 Sheets-Sheet 4

INVENTOR.
JOHN C. STRICKLER
BY
Mellin and Hanscom
ATTORNEYS

Dec. 8, 1959 | J. C. STRICKLER | 2,916,000

CAN CLOSING MACHINE

Filed Oct. 8, 1953 | 5 Sheets-Sheet 5

INVENTOR.
JOHN C. STRICKLER
BY
Mellin and Hanscom
ATTORNEYS 2,916,000
Patented Dec. 8, 1959

2,916,000

CAN CLOSING MACHINE

John C. Strickler, San Francisco, Calif.

Application October 8, 1953, Serial No. 384,997
8 Claims. (Cl. 113—22)

This invention relates to improvements in can closing machines, and particularly to a rotary machine for seaming tops to cans.

It is among the objects of the invention to provide a can closing machine by which tops may be double-seamed onto cans with improved speed and efficiency.

Another object is to provide a machine which will increase the number of cans which can be handled by a turret operating at a speed comparable to the machines heretofore available; or, conversely, to permit operation at reduced speed with resultant economies, without reduction in volume output.

A further object is to provide a machine of the character described which is of compact construction and in which seaming is effected by progressive engagement of seaming rolls eccentrically movable at relatively fixed points along the path of movement of the cans to reduce the space required for installation and operation without reducing handling capacity.

Another object is to provide a machine for seaming tops to filled cans operable while the cans are in transit at a rate and in a manner such as to substantially prevent spillage and loss due to centrifugal forces effective before the cans are closed and at the same time maintain an output equal or superior to machines heretofore available for the purpose.

A still further object is to provide a machine of relatively simple, rugged and dependable structure which can be manufactured and operated economically.

The invention has other objects and features of advantage, some of which with the foregoing will be explained in the following description of that form of the invention illustrated in the drawings. It is to be understood that the invention is not limited to the embodiment shown in the drawings, as it may be otherwise embodied within the definition of the claims.

Figure 8:
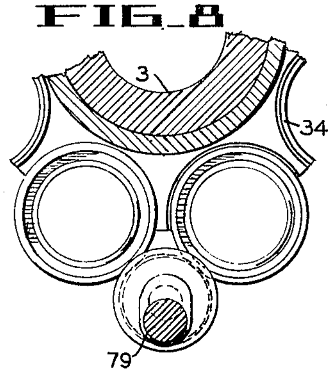
Fig. 8 is a fragmental plan view showing the position of the eccentric mounting of a seaming roll at the start of its engagement with a can.
Figure 9:
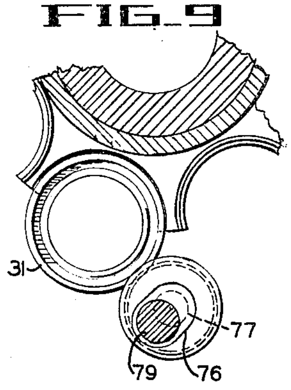
Figure 10:
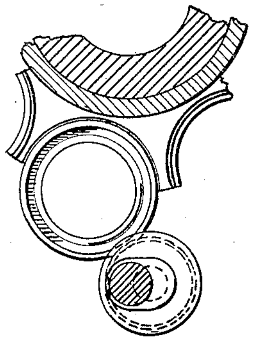
Figure 11:
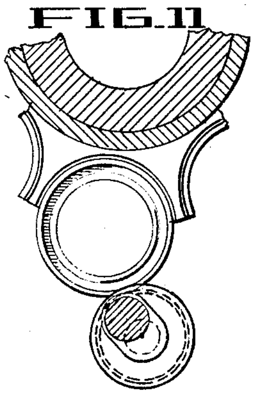
Figure 12:
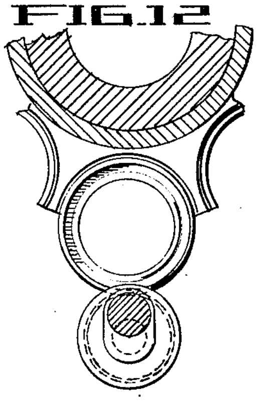
Figure 13:
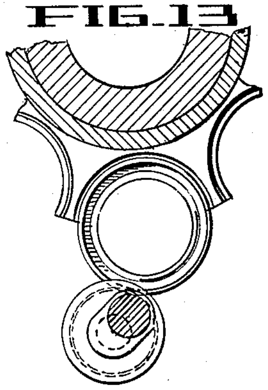
Figure 14:
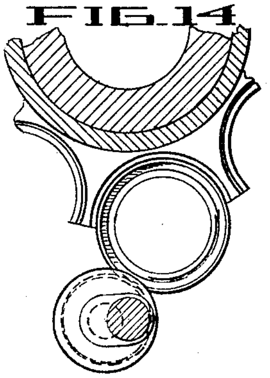
Figure 15:
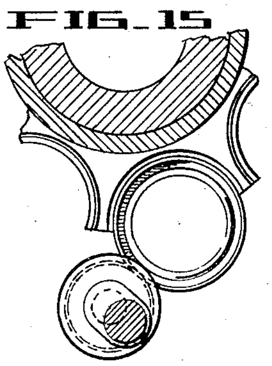
Figure 16:
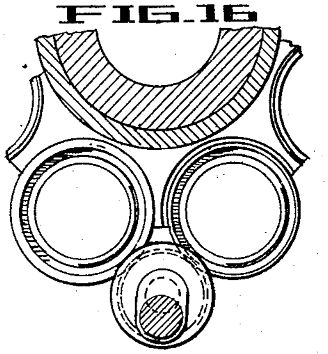

Figs. 9 to 16 inclusive are views similar to Fig. 8, illustrating successive positions of the eccentric mounting from the position shown in Fig. 8 to and including initial engagement with a succeeding can.

Figure 17:
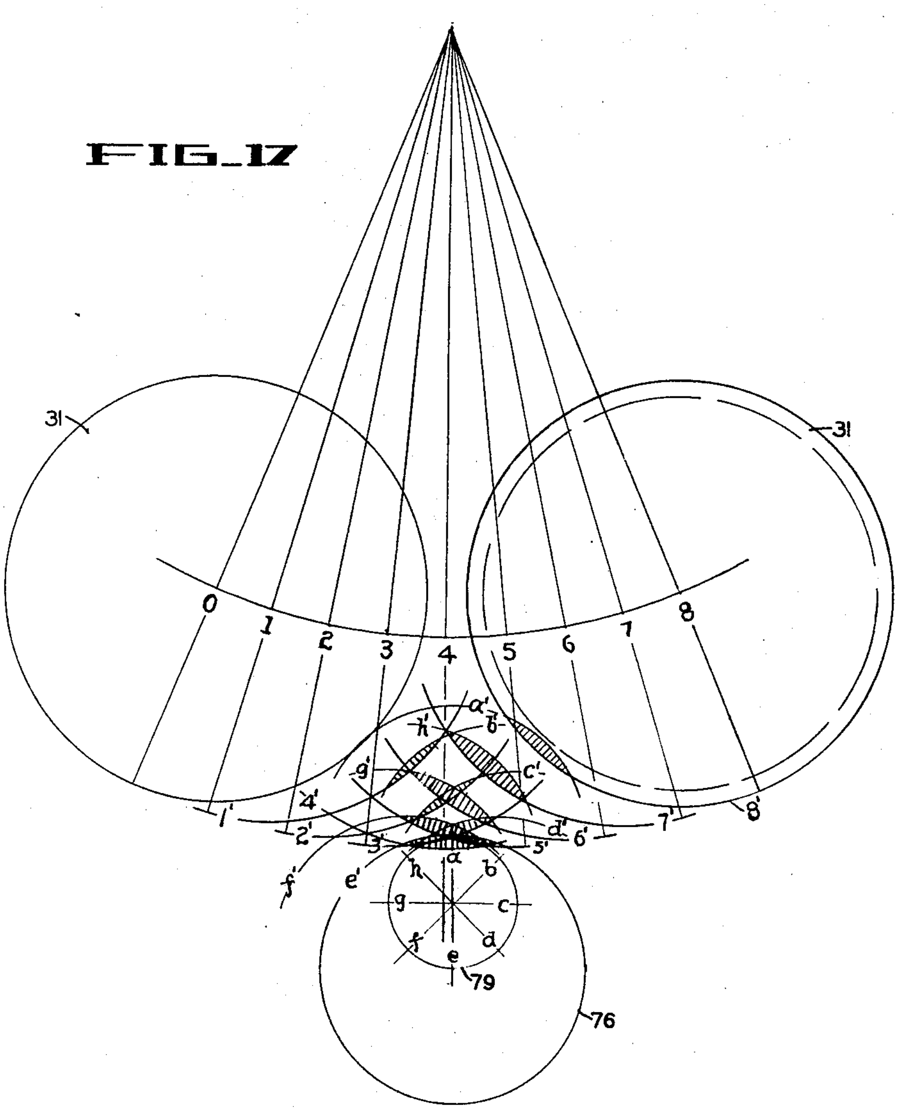

Fig. 17 is a diagrammatic view indicating the angular movement of a can and seaming roll through which seaming engagement is maintained.

In terms of broad inclusion, the machine of this invention comprises a turret operable for moving cans along a prescribed course between supply and delivery stations. Tops are positioned upon the cans by chucks carried by the turret and operable to rotate the cans and tops as they are moved from the supply to the delivery station. Seaming rolls are rotatably mounted at seaming stations spaced along the path of travel of the cans, and are eccentrically movable in timed relation to the movement of cans therepast to meet and travel with successive cans in seaming engagement with the cans and tops through a substantial distance of movement of the turret, and through one or more complete revolutions of each can and roll at each seaming station.

In terms of greater detail, the machine comprises a main base plate 1 mounted upon legs 2 or other supporting frame members. A hollow bearing cylinder 3 extends upwardly from the center portion of the plate 1. The bearing cylinder 3 is positioned perpendicular to the plane of the plate 1, and may be formed integrally therewith.

A main turret designated in general by the numeral 4 is rotatably mounted upon the bearing 3 with its lower end supported by the base plate 1. The turret may be supported directly, as illustrated, or through a suitable thrust bearing, not illustrated. The turret is provided with a gear portion 6 at its lower end engaged by a drive pinion 7 upon the upper end of a jack shaft 8 journalled upon and extending upwardly through the base plate 1. A gear 9 secured upon the shaft 8 below the plate 1 is driven by a pinion 11 secured to a main drive shaft 12 which extends upwardly through the hollow bearing 3.

The main drive shaft 12 is driven by a prime mover of any available type, not illustrated, connected to the lower end of the shaft in any convenient manner. At its upper end, the shaft 12 extends through a journal 13 carried by a top plate 14 secured to the top of the bearing cylinder 3 by machine screws 16 or other suitable securing means. The plate 14 is rigidly supported in spaced parallel relation to the base plate 1 where it is supported by the bearing cylinder 3.

A gear sleeve 17 is mounted in freely rotatable relation upon the bearing 3 between the top of the main turret 4 and the top plate 14. Gears 18 and 19 are carried by the sleeve 17 at its upper and lower ends respectively. As illustrated, the gears 18 and 19 are formed integrally with the sleeve 17, but they may be keyed or otherwise secured to a separate sleeve if desired. The sleeve 17 and gears 18 and 19 are driven from the main shaft 12 by means of a gear 21 secured to the upper end of the shaft, above the top plate 14, and meshing with a gear 22 keyed to a jack shaft 23 journalled in the top plate and provided with a pinion 24 meshing with the gear 18. The sleeve 17, with the gears 18 and 19 carried thereby, is rotated upon the bearing cylinder 3 simultaneously with and in timed relation to the rotation of the main turret 4, and in opposite direction.

The lower gear 19 meshes with a plurality of chuck driving pinions 26 secured to the upper ends of spindles 27 journalled in a flange 28 at the top of the turret. Chucks 29 are secured to the lower ends of the spindles 27 and arranged to engage the upper ends of cans 31 carried by the turret 4 from a supply station 32 to a delivery station 33. The cans 31 are engaged within concave recesses 34 circumferentially spaced around the turret and arranged to center the cans with respect to the chucks 29. The recesses 34 match with corresponding recesses 36 in a feed turret 37 and with recesses 38 in a delivery turret 39.

Figure 4:
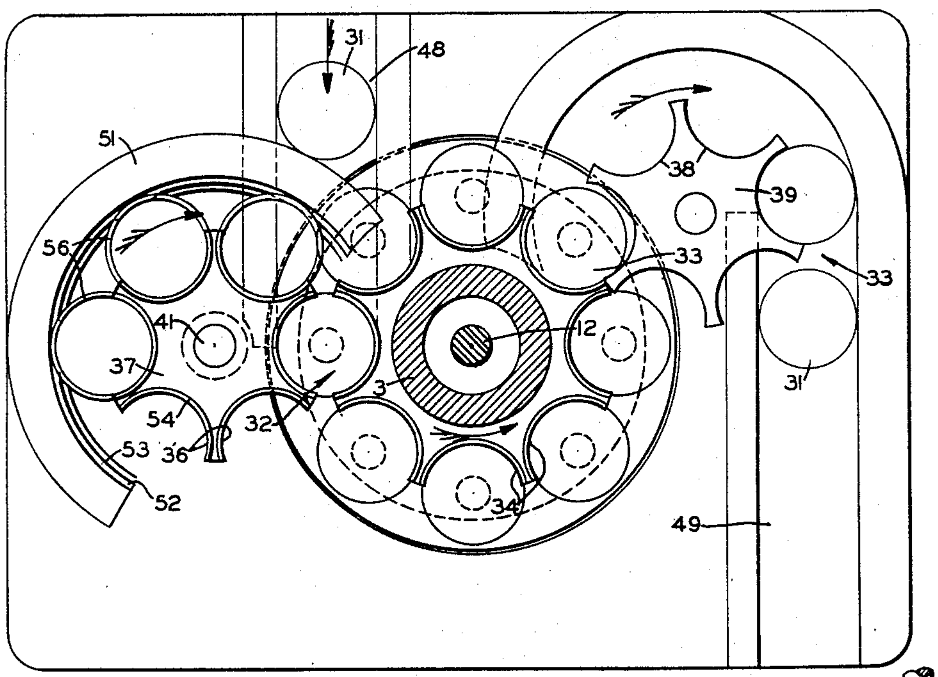
Fig. 4 is a transverse sectional view, partially diagrammatic in character, the plane of the section being indicated by the line 4—4 of Fig. 1.
Figures 5, 7:
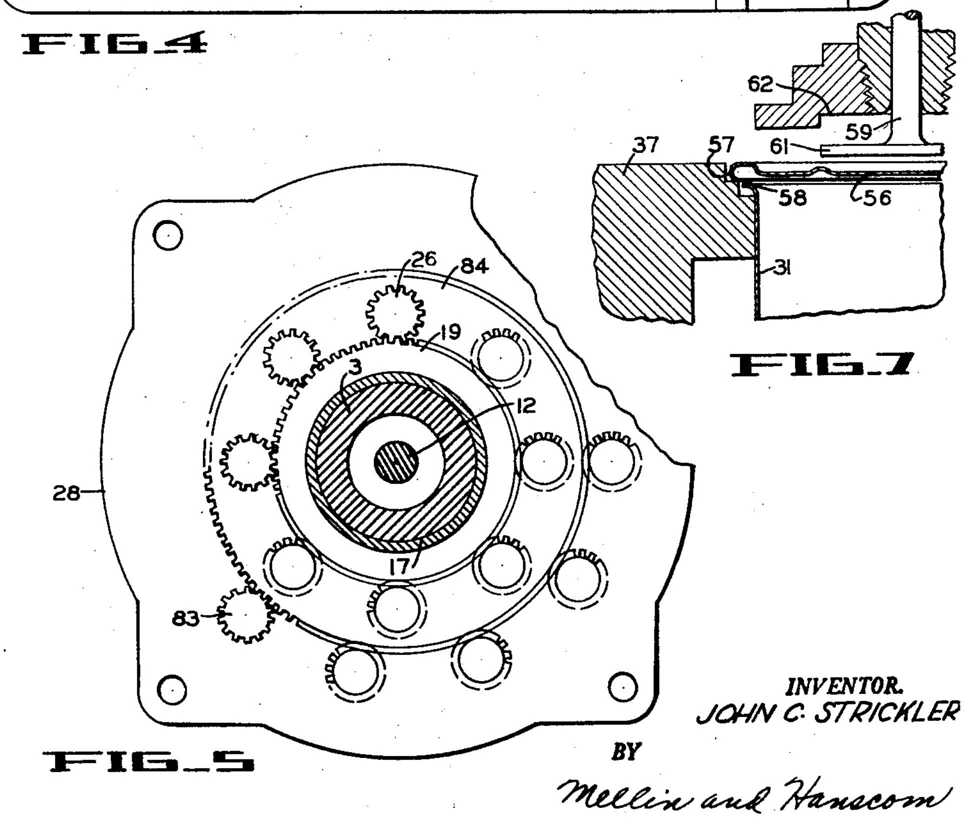
Fig. 5 is a transverse sectional view, partially diagrammatic in character, the plane of the section being indicated by the line 5—5 of Fig. 1.
Fig. 7 is a sectional detail view illustrating the manner in which the can and top are positioned for seaming.

The feed turret 37 is driven by a shaft 41 journalled upon a frame plate 42 secured in spaced relation above the main base plate 1 by supports 43. A gear 44, secured to the lower end of the shaft 41, meshes with the turret gear 6 for rotating the feed turret in timed relation to the rotation of the main turret 4. The delivery turret 39 is similarly driven by a shaft 46 provided with a gear 47 meshing with the turret gear 6. The feed turret is timed to embrace cans as they are moved to the supply station by a supply conveyor 48, and the delivery turret 39 operates to move the cans from the delivery station 33 onto a delivery conveyor 49 as indicated diagrammatically in Fig. 4 of the drawings.

A guide rail 51 is mounted adjacent the supply station 32 concentrically with the top of the feed turret 37. The rail 51 is provided with a recessed inner edge 52 forming a shoulder 53. The upper end of the feed-turret 37 is recessed along the upper ends of the can-engaging recesses 36, to provide shoulders 54 positioned in the same plane with the shoulder 53 of the guide rail 51. The shoulders 53 and 54 are arranged to engage the edges of can tops 56 fed thereto from a suitable supply by feed mechanism of any suitable natures, such as the top feeding mechanism for can-topping machines of the character heretofore available. Since the top feeding mechanism forms no part of the present invention, a detailed disclosure of such mechanism is herein unnecessary, and has been omitted.

Can tops 56 fed onto the shoulders 53 and 54 are carried by the supply turret onto the top of the cans 31 as they are fed successively to the main turret 4 for movement to the supply station 32. The cans, each with a cover centered thereover, are moved under successive chucks 29 of the main turret 4. The tops of the can bodies and the edges of the can tops are flanged for seaming in conformity with the ordinary seaming process, with a depending flange 57 of each can top arranged to engage a flaring edge 58 of a can body with which it is interfolded and seamed to form a double seam of conventional character.

Figures 1, 6:
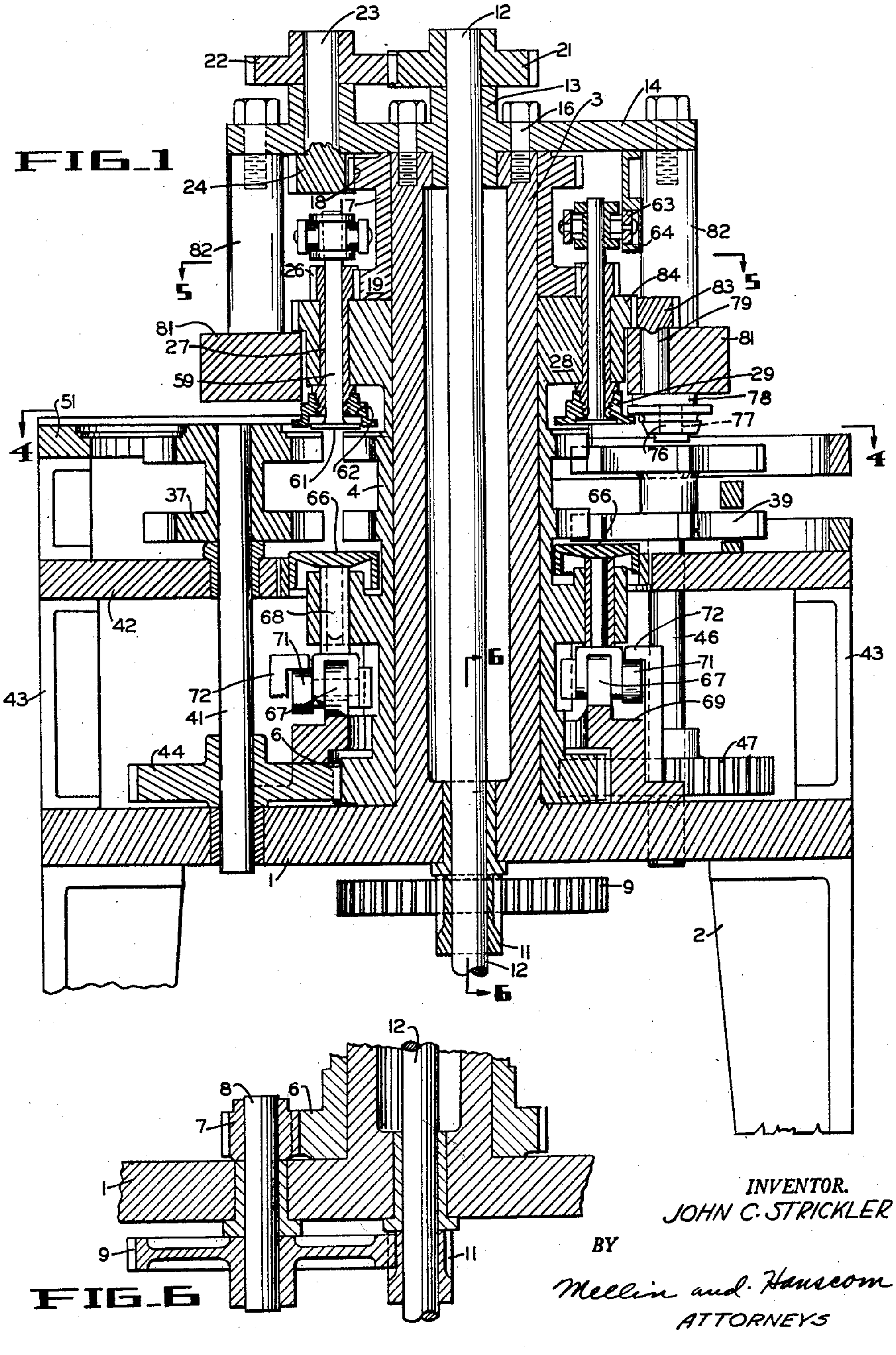
Fig. 1 is a vertical mid-sectional view of an assembled machine embodying the invention, parts being broken away, and various parts of conventional character being omitted.
Fig. 6 is a sectional detail of the turret drive, the plane of the section being indicated by the line 6—6 of Fig. 1.
Figure 2:
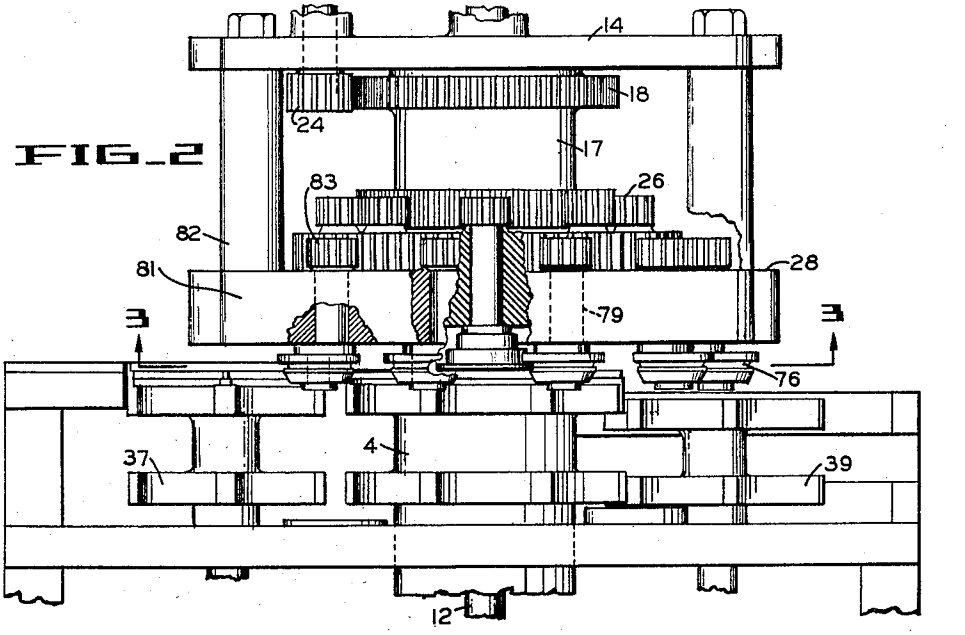
Fig. 2 is a fragmental side elevational view of the upper portion of the assembly, parts being broken away, and parts being shown in section.
Figure 3:
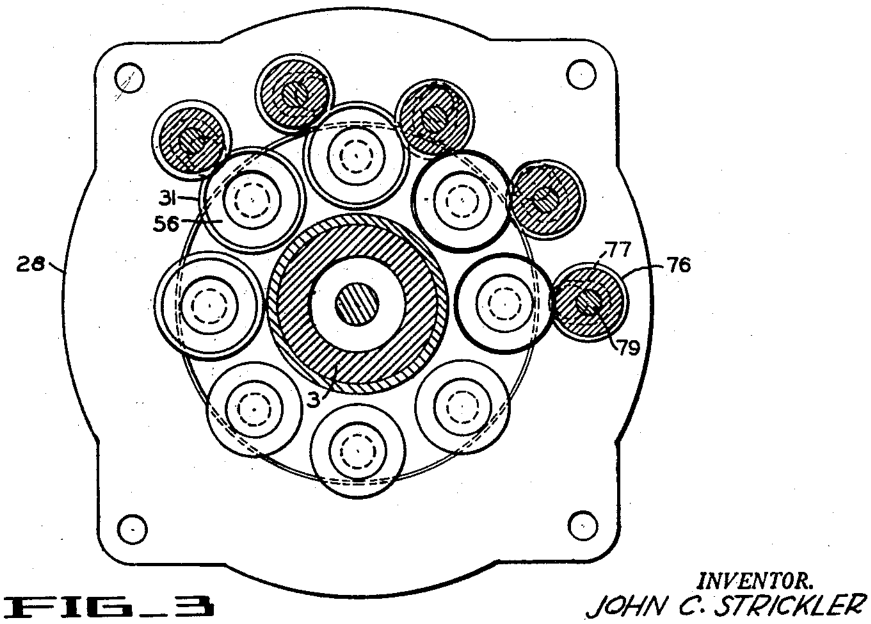
Fig. 3 is a transverse sectional view, the plane of the section being indicated by the line 3—3 of Fig. 2.

In order to prevent displacement of the top 56, and to hold it in seaming engagement with the can during the initial seaming operation, I prefer to provide a plunger 59 provided with a foot 61 arranged to seat squarely upon the upper surface of the can top, and to be movable upwardly into a recess 62 in the chuck 29 with which it is associated. The plungers 59 are reciprocated vertically by any appropriate means, such as rollers 63, engaging a cam guide 64, shaped to raise the plungers from the low position shown at the left-hand side of Fig. 1 at the start of each topping operation to the raised position, substantially flush with the chuck 29, as shown at the right-hand side of Fig. 1. Each plunger is lowered to hold a cover lightly against the top of a can as it approaches the supply station 32, and to be moved upwardly in conformity with the interfolding and seaming operation.

The cans 31, as they approach the delivery station 32, are seated upon can-raising plungers 66, axially aligned with the chucks 29 and reciprocated in timed relation to the rotation of the main turret 4 by means of rollers 67 mounted upon the lower ends of plunger stems 68 and engaging a cam plate 69. Rollers 71 upon the bearings for the rollers 67 engage annular guide rails 72 for holding the rollers 67 against the upper face of the cam 69. The cam plate 69 is secured upon the main base plate 1, and provides a housing over the turret gear 6, the sides of the plate 69 being recessed to admit the gears 7, 44 and 47, into engagement with the turret gear 6. The movement of the plungers 66 is timed to elevate each can progressively from the starting station as the edges of each can and cover are interfolded and seamed together; and the movement of the plungers provides the force by which the cans are pressed against the chucks 29 for bending the edges into interfolded relation.

Seaming rolls 76 are mounted for eccentric movement in relatively spaced positions along the path of movement of the cans between the supply station and the delivery station. The seaming rolls 76 are freely rotatable upon bearing pins 77 secured to mounting plates 78 in eccentric relation to mounting shaft 79 secured to the plates 78 and journalled in a roll-mounting ring 81 suspended from the top plate 14 by bracket arms 82. Pinions 83 secured to the upper end of the mounting shaft 79 mesh with a gear 84 extending annularly around the top of the turret flange 28. The eccentricity of the roll-bearing pins 77 relative to the axis of the mounting shafts 79 is designed to cause the seaming rolls 76 to be moved in substantial conformity with the movement of the cans and tops therepast, along the path from the supply station to the delivery station. Each seaming roll is moved to meet each successive can, and to be moved therewith through a substantial angle of arcuate movement.

As a can and top approach the first of the seaming rolls 76, as indicated in Fig. 8 of the drawings, the seaming roll swings inwardly to meet the can and to bear against the depending flange of the cover. As the can is moved along the arcuate path toward the delivery station, the seaming roll is moved eccentrically about the axis of its mounting shaft 79 at a rate corresponding to the rate of movement of the can, and along a path which causes the seaming roll to maintain engagement with the can top. During this movement, the can is rotated by means of the chuck 29, and is pressed against the receding seaming roll with sufficient pressure to cause the depending flange 57 of the can to be pressed inwardly under the flaring edge 58 of the can. At the same time the plunger 66 raises the can and forces the flaring edge 58 to be spread outwardly into engagement with the depending flange. Further upward movement of the can, coupled with its rotation by the chuck 29 causes the interengaging portions of the top and can to be doubled into interlocking engagement.

As the can leaves the first seaming roll, it is met by a second seaming roll which is moved upon its eccentric mounting shaft to maintain engagement with the can and top for applying further seaming pressure to the interlocking flanges. The seaming rolls 76 meet each can and move therewith, through a substantial angle of movement during which the interlocking flanges of can and top are advanced toward their final double-seamed relationship. This movement is illustrated in Figs. 8 to 16 inclusive, and is illustrated diagrammatically in Fig. 17 of the drawings.

Referring to Fig. 17, the movement of a can 31 is indicated in nine successive positions from a starting position centered at a point designated zero through equal angles of movement to successive positions centered at points 1 to 8 inclusive. At the same time the seaming roll is moved through a succession of positions indicated with respect to the roller mounting shaft 79 by the indicia *a, b, c, d, e, f, g* and *h*. Corresponding positions of the seaming roll itself are indicated by the arcs designated *a', b', c', d', e', f', g'* and *h'*. As illustrated in the diagram, the seaming roll meets the oncoming can 31 at the point of tangency of the can top and the arc *a'*. As the can is moved from the zero position to the position 1, the seaming roll 76 is receded so that engagement will be indicated by the shaded area between the arc 1' and the arc *b'*. As the can is moved to position 2, engagement of the can with the roll 76 will be along the shaded area between the arc 2' and the arc *c'*. The engagement will continue, with progressively increasing overlap if desired, until the can reaches the position 8, at which time the seaming roll 76 will have returned to its starting position indicated by the arc *a'*. The amount the seaming roll overlaps the can top is designed to conform to the progressive infolding of the top edge of the can to form the double seam. This may be varied by varying the amount the axis of the shaft 79 is offset from the vertical center line between the extreme positions, 0 and 8, of the can, corresponding to the position indicated by the line 4 of the diagram Fig. 17, and which spacing is indicated by the parallel vertical lines at the center of the shaft 79.

The several rolls 76 are so spaced along the path of movement of the cans between the supply and delivery stations as to meet each approaching can at about the time it is disengaged by the seaming roll 76 which it has just passed. While I have illustrated a series of five seaming rolls, this number may be varied to meet different requirements by appropriate design of the seaming face and eccentricity of each roll 76 to vary the degree of progressive overlap with the approaching can.

The seaming rolls 76 are positively moved about their eccentric mounting shafts 79 to maintain a positive pressure against the can while both the can and the seaming roll are rotated. The range of movement through which the seaming roll 76 maintains engagement with the can, coupled with the rotation of the can throughout that movement, insures an effective rolling of the interlocking edges of can and top in seamed relation. As each can leaves the last seaming roll, the interfolded edges of can and cover will have been rolled firmly into double seamed relationship for delivery onto the delivery conveyor 49.

The can closing machine of the present invention is particularly adapted to use for closing cans filled with a liquid product of a nature such that it may be slopped out of the can by rotation or a sudden change in the direction of movement of the can. In the present device, cans are fed to the supply station along a straight line as indicated by the arrow at the left of Fig. 4 of the drawings. As the can is moved into its starting position, a cover is moved onto the can where it is held lightly by the plunger foot 61 as the can is advanced by rotation of the turret 4. The lifting plunger 66 then presses the can and top against the chuck 29 before rotating movement is imparted to the can by the chuck. Since the interfolding and seaming of the edges of the can and top begins coincidentally with the turning movement of the can, an effective seaming engagement is accomplished before material displacement of the contents can be caused by rotation of the can itself. This permits cans to be fed to the topping mechanism at a relatively high rate of speed, and since the machine itself is a very compact form such that the cans are moved along an arc of relatively short radius, the machine may be operated at a relatively high speed and with a high degree of efficiency.

Having thus described my invention, what I claim and desire to secure by Letters Patent is:

1. A machine for seaming tops onto cans, comprising a turret operable to move a succession of cans along a path of movement between can receiving and can delivery stations, a plurality of chucks upon the turret for positioning tops upon the cans in seaming relation, means for rotating said chucks, a plurality of seaming rolls eccentrically mounted at individual fixed stations spaced along the path of movement of the cans, said seaming rolls being rotatably mounted for free rotation about their own axes and means for individually moving each of the seaming rolls upon its eccentric mounting to maintain seaming engagement with successive cans and tops through a substantial degree of movement of the turret.

2. A machine for seaming tops onto cans comprising a turret rotatable to move a succession of cans along an arcuate path between can receiving and can delivering stations, a plurality of chucks circumferentially spaced upon the turret for positioning tops in seaming engagement with the cans during movement along the path, means for rotating said chucks, means for raising the cans and their tops progressively into engagement with the adjacent chucks, a plurality of seaming rolls each rotatably mounted for free rotation about its axis, means eccentrically mounting said rolls at fixed seaming stations spaced along the path of movement of the cans, said rolls being adapted to apply pressure in progressive stages for seaming the top to the can, and means for rotating the eccentric mounting of each roll to advance and recede each seaming roll in timed relation with the movement of each can therepast for maintaining seaming engagement of each roll with successive cans and tops through a substantial degree of angular movement.

3. A machine for seaming tops onto cans comprising a turret rotatable to move a succession of cans along an arcuate path between can receiving and can delivering stations, a plurality of chucks circumferentially spaced upon the turret for positioning tops in seaming engagement with the cans during movement along the path, means for rotating said chucks, means for raising the cans and their tops progressively into engagement with the adjacent chucks, a plurality of seaming rolls each rotatably mounted for free rotation about its axis, means eccentrically mounting said rolls at fixed seaming stations spaced along the path of movement of the cans, said rolls being adapted to apply pressure in progressive stages for seaming the top to the can, and means geared to the turret for rotating the eccentric mounting of each roll to positively advance and recede each seaming roll in timed relation with the movement of each can therepast for maintaining seaming engagement of each roll with successive cans and tops through a substantial degree of angular movement.

4. A machine for seaming tops onto cans comprising a turret rotatable to move a succession of cans along an arcuate path between can receiving and can delivering stations, a plurality of chucks circumferentially spaced upon the turret for positioning tops in seaming engagement with the cans during movement along the path, means for rotating said chucks, means for raising the cans and their tops progressively into engagement with the adjacent chucks, a plurality of freely rotatable seaming rolls each mounted for free rotation about its axis, means eccentrically mounting each of said rolls at fixed seaming stations spaced along the path of movement of the cans, said rolls being adapted to progressively bend overlapping edge portions of each can and cover into seamed engagement, and gear means operating in timed relation to the turret for actuating the eccentric mounting of the seaming rolls to move said rolls along arcuate paths coinciding with the path of movement of the cans by the turret through a substantial angle of movement adjacent each seaming station.

5. A machine for seaming tops onto cans comprising a rotatable turret operable to move cans along an arcuate path, means geared to the turret for advancing a succession of cans and tops into seaming position upon the turret, means geared to the turret for rotating the can for seaming during movement along the arcuate path, a plurality of seaming rolls mounted at fixed points spaced along the arcuate path, said seaming rolls being rotatably mounted for free rotation about their own axes and means geared to the turret for imparting eccentric rotation to the seaming rolls conforming to movement of cans therepast for maintaining seaming engagement of the rolls with successive cans and tops through a substantial degree of rotation of the turret.

6. A machine for seaming tops onto cans comprising a hollow cylindrical bearing, a drive shaft extending axially through the bearing, a turret rotatably mounted over the bearing, can rotating means upon the turret, gear means connecting the shaft to the turret for rotating the same to move a succession of cans along an arcuate path, means to position tops upon the cans in seaming relation thereto, means geared to the drive shaft for actuating the can rotating means, means actuated by rotation of the turret for raising the cans while they are being moved along the path, seaming rolls mounted eccentrically for orbital movement about fixed points adjacent the path, said seaming rolls being rotatably mounted for free rotation about their own axes and means geared to the turret for imparting orbital movement to the seaming rolls for maintaining seaming engagement with successive cans and tops through a substantial degree of rotation of the turret.

7. A machine for seaming tops upon cans comprising a hollow cylindrical bearing, a drive shaft extending axially through the bearing, a turret rotatably mounted upon the bearing, gear means connecting the drive shaft to the turret for rotating the same to move a succession of cans along an arcuate path, a plurality of rotatable chucks upon the turret for positioning tops upon the cans in seaming relation, a chuck actuating gear concentric with the drive shaft and turret, gear means connecting the drive shaft and chuck actuating gear for rotating the chucks during rotation of the turret, and seaming rolls eccentrically mounted for orbital movement about fixed points along the arcuate path and engageable by cans moved therepast, said seaming rolls being rotatably mounted for free rotation about their own axes, and means for causing orbital movement of said rolls in timed relation with the rotation of said turret for maintaining seaming engagement of the rolls with successive cans and tops through a substantial degree of rotation of the turret.

8. A machine for seaming tops upon cans comprising a hollow cylindrical bearing, a drive shaft extending axially through the bearing, a turret rotatably mounted upon the bearing, gear means connecting the drive shaft to the turret for rotating the same to move a succession of cans along an arcuate path, a plurality of rotatable chucks upon the turret for positioning tops upon the cans in seaming relation, a chuck actuating gear concentric with the drive shaft and turret, gear means connecting the drive shaft and the chuck actuating gear for rotating the chucks during rotation of the turret, means operable by rotation of the turret for progressively raising the cans relative to the chucks, seaming rolls eccentrically mounted for orbital movement about fixed points along the arcuate path and engageable by cans moved therepast, said seaming rolls being rotatably mounted for free rotation about their own axes and means geared to the turret for imparting eccentric movement to the seaming rolls for maintaining seaming engagement of the rolls with successive cans and tops through a substantial degree of rotation of the turret.

References Cited in the file of this patent

UNITED STATES PATENTS

| | | |
|---|---|---|
| 1,077,393 | Conradi | Nov. 4, 1913 |
| 1,332,785 | Warme | Mar. 2, 1920 |
| 1,348,650 | Kronquest | Aug. 3, 1920 |
| 1,398,018 | Hill | Nov. 22, 1921 |